(12) United States Patent
August et al.

(10) Patent No.: US 11,799,318 B2
(45) Date of Patent: Oct. 24, 2023

(54) PREDICTIVE BATTERY MANAGEMENT FOR APPLICATIONS USING BATTERY ENERGY TO OVERCOME ELECTRICAL CIRCUIT VOLTAGE AND CURRENT LIMITATIONS

(71) Applicant: SCHNEIDER ELECTRIC IT CORPORATION, Foxboro, MA (US)

(72) Inventors: Jeffrey M. August, Methuen, MA (US); Eyob Demissie, Westford, MA (US); Steven Allen Diggins, Merrimack, NH (US); Anurag Arjundas Jivanani, Groton, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/647,109

(22) Filed: Jan. 5, 2022

(65) Prior Publication Data

US 2022/0224150 A1 Jul. 14, 2022

Related U.S. Application Data

(60) Provisional application No. 63/135,052, filed on Jan. 8, 2021.

(51) Int. Cl.
*H02J 9/06* (2006.01)
*H02J 3/00* (2006.01)
*H02J 7/00* (2006.01)

(52) U.S. Cl.
CPC ............. *H02J 9/062* (2013.01); *H02J 3/003* (2020.01); *H02J 3/004* (2020.01); *H02J 7/0048* (2020.01);
(Continued)

(58) Field of Classification Search
CPC .......... H02J 9/062; H02J 3/003; H02J 7/0048; H02J 3/004; H02J 7/00712; H02J 7/0063
(Continued)

(56) References Cited

U.S. PATENT DOCUMENTS 9,350,188 B2 * 5/2016 Hasebe .............. G03G 15/5004
2011/0095612 A1 4/2011 Kirkpatrick
(Continued)

FOREIGN PATENT DOCUMENTS

EP 1670115 B1 5/2013
JP H0993784 A 4/1997
(Continued)

OTHER PUBLICATIONS

Extended European Search Report from corresponding European Application No. 22150615.7 dated May 16, 2022.

*Primary Examiner* — Michael R. Fin
(74) *Attorney, Agent, or Firm* — Lando & Anastasi, LLP

(57) ABSTRACT

Aspects of the disclosure include a power device having a first input configured to be coupled to a main power source, a second input configured to be coupled to a back-up power source, an output configured to be coupled to a load, the load being configured to perform a procedure, and at least one controller configured to determine a required energy for the load to perform the procedure, estimate an amount of available energy predicted to be available to the power device during the procedure, the available energy being derived from at least the back-up power source, determine whether the amount of available energy predicted to be available is equal to or greater than the required energy, and prevent power from being provided at the output responsive to determining that the amount of available energy predicted to be available is less than the required energy.

20 Claims, 6 Drawing Sheets

(52) U.S. Cl.
CPC ........ *H02J 7/0063* (2013.01); *H02J 7/00712* (2020.01)

(58) Field of Classification Search
USPC ...................................... 307/48, 64
See application file for complete search history.

(56) References Cited

U.S. PATENT DOCUMENTS

| | | | |
|---|---|---|---|
| 2015/0280493 A1* | 10/2015 | Cha .................. | H02J 7/0068 307/64 |
| 2016/0224088 A1* | 8/2016 | Nguyen .................. | G06F 1/263 |
| 2018/0138731 A1* | 5/2018 | Baba .................. | G06Q 50/06 |

FOREIGN PATENT DOCUMENTS

| | | | |
|---|---|---|---|
| JP | 2008148505 A | 6/2008 | |
| JP | 2013121205 A | 6/2013 | |

\* cited by examiner

PREDICTIVE BATTERY MANAGEMENT FOR APPLICATIONS USING BATTERY ENERGY TO OVERCOME ELECTRICAL CIRCUIT VOLTAGE AND CURRENT LIMITATIONS

CROSS-REFERENCE TO RELATED APPLICATIONS

This application claims priority under 35 U.S.C. § 119(e) to U.S. Provisional Application Ser. No. 63/135,052, titled "PREDICTIVE BATTERY MANAGEMENT FOR APPLICATIONS USING BATTERY ENERGY TO OVERCOME ELECTRICAL CIRCUIT VOLTAGE & CURRENT LIMITATIONS," filed on Jan. 8, 2021, which is hereby incorporated by reference in its entirety.

BACKGROUND

1. Field of the Disclosure

At least one example in accordance with the present disclosure relates generally to uninterruptible power supplies.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a power device is provided comprising a first input configured to be coupled to a main power source, a second input configured to be coupled to a back-up power source, an output configured to be coupled to a load, the load being configured to perform a procedure, and at least one controller configured to determine a required energy for the load to perform the procedure, estimate an amount of available energy predicted to be available to the power device during the procedure, the available energy being derived from at least the back-up power source, determine whether the amount of available energy predicted to be available is equal to or greater than the required energy, and prevent power from being provided at the output responsive to determining that the amount of available energy predicted to be available is less than the required energy.

In at least one example, the at least one controller is further configured to control the power device to deliver power to the output responsive to determining that the amount of available energy is equal to or greater than the required energy. In various examples, the power device includes an output switch coupled to the output, and preventing power from being provided at the output includes controlling the output switch to be in a non-conducting state. In some examples, determining whether the amount of available energy predicted to be available is equal to or greater than the required energy includes determining a required power of the load throughout an execution of the procedure by the load, estimating an amount of power that will be available from the main power source and the back-up power source throughout the execution of the procedure, and determining whether the amount of power estimated to be available from the main power source and the back-up power source is equal to or greater than the required power throughout the execution of the procedure.

In at least one example, the at least one controller is configured to prevent the power from being provided at the output responsive to determining that the required power of the load is predicted to be greater than the estimated amount of power that will be available from the main power source and the back-up power source at any time during the procedure. In various examples, the at least one controller is configured to control, while the load executes the procedure, the power device to draw main power from the main power source, and control, while the load executes the procedure, the power device to draw back-up power from the back-up power source responsive to determining that a required power of the load is greater than the main power. In some examples, the at least one controller is further configured to control the power device to deliver power to the output responsive to determining that the amount of available energy predicted to be available is equal to or greater than the required energy, and an amount of energy received from the back-up power source and provided to the load during the procedure is greater than a maximum energy capacity of the back-up power source.

According to aspects of the disclosure, a computing device for analyzing a power device having a first input configured to be coupled to a main power source, a second input configured to be coupled to a back-up power source, and an output configured to be coupled to a load configured to perform a procedure is provided, the computing device comprising at least one processor configured to determine a required energy for the load to perform the procedure, estimate an amount of available energy predicted to be available to the power device during the procedure, the available energy being derived from at least the back-up power source, determine whether the amount of available energy predicted to be available is equal to or greater than the required energy, and prevent power from being provided at the output responsive to determining that the amount of available energy predicted to be available is less than the required energy.

In at least one example, the computing device is the power device. In various examples, the computing device is remote from the power device. In some examples, the computing device is a server external to the power device. In at least one example, the computing device includes at least one communication interface configured to be communicatively coupled to the power device, and preventing the power from being provided at the output includes providing, via the communication interface, instructions to the power device to not provide power to the load.

According to aspects of the disclosure, a non-transitory computer-readable medium storing thereon sequences of computer-executable instructions for analyzing a power device having a first input configured to be coupled to a main power source, a second input configured to be coupled to a back-up power source, and an output configured to be coupled to a load configured to perform a procedure is provided, the sequences of computer-executable instructions including instructions that instruct at least one processor to determine a required energy for the load to perform the procedure, estimate an amount of available energy predicted to be available to the power device during the procedure, the available energy being derived from at least the back-up power source, determine whether the amount of available energy predicted to be available is equal to or greater than the required energy, and prevent power from being provided at the output responsive to determining that the amount of available energy predicted to be available is less than the required energy.

In at least one example, the instructions further instruct the at least one processor to control the power device to deliver power to the output responsive to determining that the amount of available energy predicted to be available is equal to or greater than the required energy. In various examples, the power device further includes an output switch coupled to the output, and preventing power from being provided at the output includes controlling the output switch to be in a non-conducting state. In some examples, determining whether the amount of available energy predicted to be available is equal to or greater than the required energy includes determining a required power of the load throughout an execution of the procedure by the load, estimating an amount of power that will be available from the main power source and the back-up power source throughout the execution of the procedure, and determining whether the amount of power estimated to be available from the main power source and the back-up power source is equal to or greater than the required power throughout the execution of the procedure.

In at least one example, the instructions instruct at least one processor to prevent the power from being provided at the output responsive to determining that the required power of the load is predicted to be greater than the estimated amount of power that will be available from the main power source and the back-up power source at any time during the procedure. In various examples, the instructions further instruct the at least one processor to control, while the load executes the procedure, the power device to draw main power from the main power source, and control, while the load executes the procedure, the power device to draw back-up power from the back-up power source responsive to determining that a required power of the load is greater than the main power. In some examples, the instructions further instruct the at least one processor to control the power device to deliver power to the output responsive to determining that the amount of available energy predicted to be available is equal to or greater than the required energy, and an amount of energy received from the back-up power source and provided to the load during the procedure is greater than a maximum energy capacity of the back-up power source.

Aspects of the disclosure include a method of analyzing a power device having a first input configured to be coupled to a main power source, a second input configured to be coupled to a back-up power source, and an output configured to be coupled to a load configured to perform a procedure, the method comprising determining a required energy for the load to perform the procedure, estimating an amount of available energy predicted to be available to the power device during the procedure, the available energy being derived from at least the back-up power source, determining whether the amount of available energy predicted to be available is equal to or greater than the required energy, and preventing power from being provided at the output responsive to determining that the amount of available energy predicted to be available is less than the required energy.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
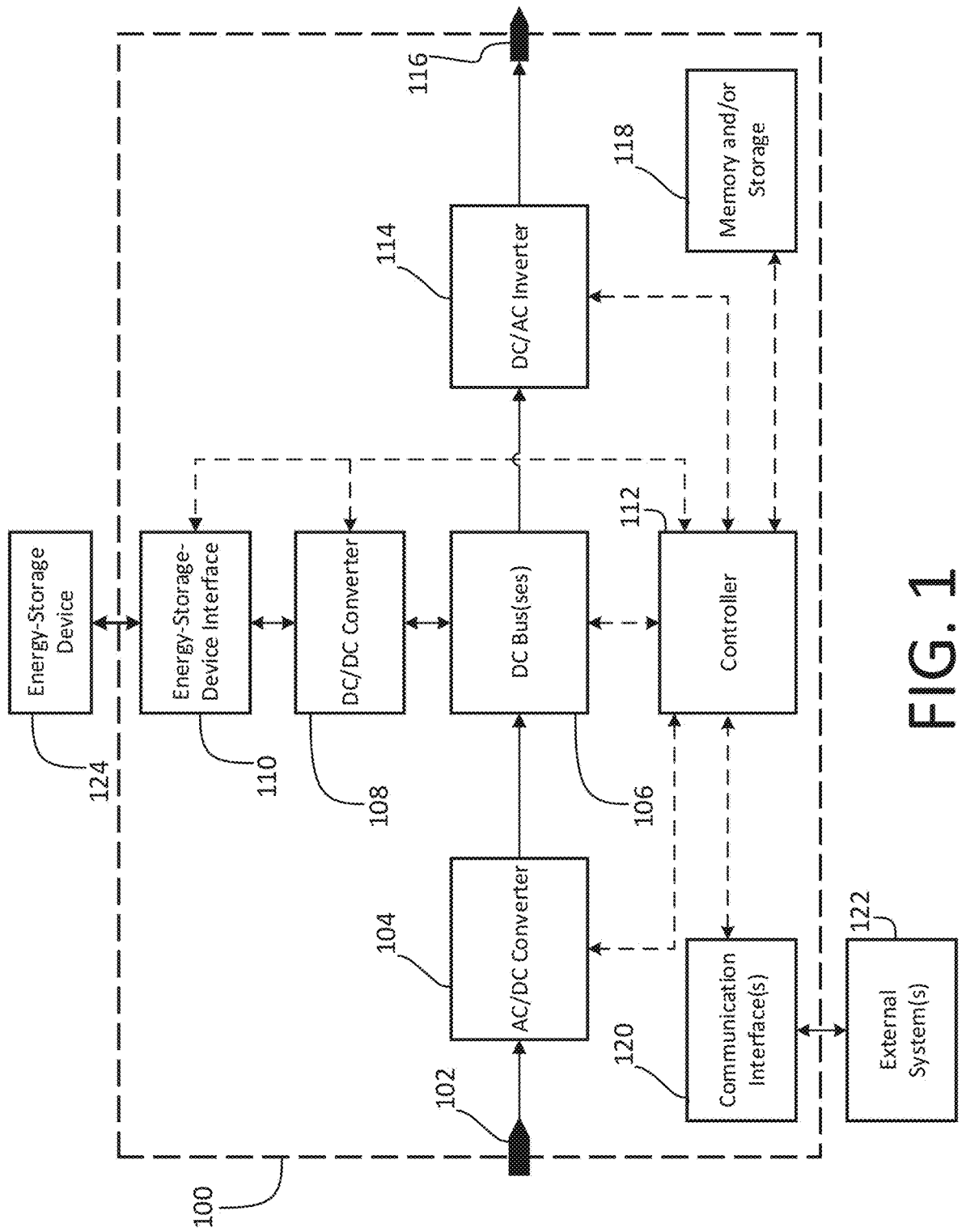
FIG. 1 illustrates a block diagram of an uninterruptible power supply (UPS) according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, UPSs may be used to provide uninterruptible power to one or more loads derived from one or more power sources. For example, a UPS may receive main power from a main power source and may receive backup power from a backup power source. If main power from the main power source is available, the UPS may provide output power derived from the main power source to the one or more loads. If main power becomes unavailable, the UPS may provide output power derived from the backup power source, rather than the main power source, to the one or more loads.

Examples discussed herein include a UPS configured to provide output power derived from multiple power sources at the same time. For example, a UPS may be configured to provide output power derived from a main power source and a backup power source. By providing output power derived from multiple sources at the same time, the aggregate output power provided by the UPS may be greater than either the main power source or the backup power source is capable of supporting individually. Thus, a maximum output power of the UPS may be increased.

Increasing the output power of the UPS may be particularly advantageous where a load requires more power than an individual power source (for example, a utility mains) is rated to provide. An example load includes a medical device or system configured to perform certain procedures in a patient's residence. Such a procedure may be, for example, a hemodialysis procedure performed by a hemodialysis system. Depending on the locality of the patient, a main residential power supply may not provide as much power to the medical device or system as is required to perform the procedure. For example, certain energy-intensive portions of the procedure may require more than a rated power of a residential power supply. In various regions of the United States, for example, a main residential power supply may provide power via AC-power outlets designed to provide a maximum voltage of 120 V and a maximum current of 12 A, such that a maximum power is 1440 W. If the medical device or system requires more than 1440 W at any time during the procedure, the main residential power supply may be insufficient to power the medical device or system.

Accordingly, an example UPS may be connected to a main power supply, such as a residential power supply, and to a backup power supply, such as a battery, to address the foregoing concerns by providing supplementing the main power supply with the backup power supply. The example UPS may be operated to provide more output power than can be provided by a main power supply individually, because the main power may be supplemented by the back-up power. Thus, the UPS connected to a main power supply may be able to power a device configured to perform a procedure (such as a hemodialysis procedure, as discussed above) that requires more power than is available from the main power supply individually. It is to be appreciated that an "procedure" is not necessarily medical in nature. As used herein, a procedure may also be referred to as a process, operation, or routine, for example, performed by a load, where the procedure, operation, process, or routine may include multiple discrete portions, parts, sub-routines, and so forth.

It may be advantageous to determine whether the UPS can supply enough energy to enable a device to fully complete a procedure before the device begins the procedure. For example, the UPS may determine how much energy a procedure requires, and how much energy is estimated to be available from a main power supply and from a back-up power supply. If the energy required by the procedure exceeds the estimated available energy, then the UPS may provide an appropriate warning indicating that sufficient power may be unavailable. In some examples, the UPS may be prevented from providing any power at all to the device connected thereto such that the procedure cannot be initiated. Accordingly, examples disclosed herein may enable procedures to be safely performed that have energy requirements in excess of an estimated available energy from a main power source.

Current power-supply systems, such as uninterruptible power-supply systems, may provide output power derived from one of multiple power sources. Such power-supply systems may operate inefficiently because certain loads may require an amount of energy that exceeds an estimated available energy of one or more of the multiple power sources. If a load loses access to power before a procedure is complete, issues may arise from partially executing the procedure that would otherwise not arise if the procedure were never initiated. This is a technical problem. An exemplary embodiment of a power-supply system includes a power device having a first input configured to be coupled to a main power source, a second input configured to be coupled to a back-up power source, an output configured to be coupled to a load, the load being configured to perform a procedure, and at least one controller configured to determine a required energy for the load to perform the procedure, estimate an amount of available energy predicted to be available to the power device during the procedure, the available energy being derived from at least the back-up power source, determine whether the amount of available energy predicted to be available is equal to or greater than the required energy, and prevent power from being provided at the output responsive to determining that the amount of available energy predicted to be available is less than the required energy.

At least this foregoing combination of features comprises a power-supply system that serves as a technical solution to the foregoing technical problem. This technical solution is not routine and is unconventional. This technical solution is a practical application of the power-supply system design that solves the foregoing technical problem and constitutes an improvement in the technical field of power-supply systems at least by enabling procedures to be safely performed that have energy requirements in excess of an estimated available energy from an individual power source.

FIG. 1 illustrates a block diagram of a UPS 100 according to an example. The UPS 100 includes an input 102, an AC/DC converter 104, one or more DC busses 106, a DC/DC converter 108, an energy-storage-device interface 110, at least one controller 112 ("controller 112"), a DC/AC inverter 114, an output 116, a memory and/or storage 118, and one or more communication interfaces 120 ("communication interfaces 120"). The UPS 100 may be coupled to one or more external systems 122 ("external systems 122"), such as via the communication interfaces 120, and/or may be coupled to one or more energy-storage devices 124 ("energy-storage device 124"), such as via the energy-storage-device interface 110.

In some examples, one or more components illustrated as being part of the UPS 100 may instead be external to, and coupled to, the UPS 100. Similarly, one or more components illustrated as being external to the UPS 100 may instead be internal to the UPS 100. For example, the energy-storage device 124 may be internal to the UPS 100 and may provide back-up power to the DC/DC converter 108 either directly or through the energy-storage-device interface 110. In some examples, the UPS 100 may include additional, fewer, or different components than those illustrated in FIG. 1. For example, the UPS 100 may include at least two inverters (including the DC/AC inverter 114) each coupled to a respective output (including the output 116), where a first inverter provides first AC power at a first voltage (for example, 120 VAC) to a first output, and a second inverter provides second AC power at a second voltage (for example, 240 VAC) to a second output.

Furthermore, although the UPS 100 may receive AC input power at the input 102 in some examples, in other examples the UPS 100 may receive DC input power at the input 102 (and/or at another input) in addition to, or in lieu of, the AC input power. Although the UPS 100 may provide AC output power at the output 116 in some examples, in other examples the UPS 100 may provide DC output power at the output 116 in addition to, or in lieu of, the AC output power.

The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy-storage-device interface 110, and is communicatively coupled to the controller 112. The energy-storage-device interface 110 is coupled to the DC/DC converter 108, is configured to be coupled to the energy-storage device 124, and is communicatively coupled to the controller 112. The DC/AC inverter 114 is coupled to the one or more DC busses 106 and to the output 116, and is communicatively coupled to the controller 112. The output 116 is coupled to the DC/AC inverter 114, and to one or more loads (not pictured).

The controller 112 is communicatively coupled to the AC/DC converter 104, the one or more DC busses 106, the DC/DC converter 108, the energy-storage-device interface 110, the DC/AC inverter 114, the memory and/or storage 118, and the communication interfaces 120. The memory and/or storage 118 is communicatively coupled to the controller 112. The communication interfaces 120 are communicatively coupled to the controller 112.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors configured to sense parameters of the input voltage. For example, the controller 112 may include or be coupled to one or more sensors (which may be internal or external to the UPS 100) configured to sense a voltage level of the AC power received at the input 102.

When AC power provided to the input 102 is acceptable (for example, by having parameters, such as an input-voltage value, that meet specified values, such as by falling within a range of acceptable input-voltage values), the controller 112 controls components of the UPS 100 to operate in a normal mode of operation. In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/AC inverter 114 and, in some examples, to the DC/DC converter 108. The DC/DC converter 108 converts the received DC power and provides the converted DC power to the energy-storage-device interface 110 to charge the energy-storage device 124. The DC/AC inverter 114 receives DC power from the one or more DC busses 106, converts the DC power into regulated AC power, and provides the regulated AC power to the output 116 to be delivered to at least one load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation. In the backup mode of operation, DC power is discharged from the energy-storage device 124 to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPSs, and so forth.

Accordingly, the UPS 100 may be operable to provide uninterrupted output power at the output 116 that is derived from input power (or "main power") received at the input 102 or backup power received from the energy-storage device 124. In various examples, the UPS 100 may additionally or alternately be configured to provide output power at the output 116 derived from both the input power and the backup power. For example, the UPS 100 may provide output power at the output 116 derived from both the input power and the backup power where a load coupled to the output 116 requires more power and/or energy than is estimated to be available from the input power or the backup power individually. In various examples, the load may be executing a procedure having an estimable and/or known power and/or energy requirement such that the UPS 100 may determine whether the estimated available energy meets or exceeds the energy requirement.

Figure 2:
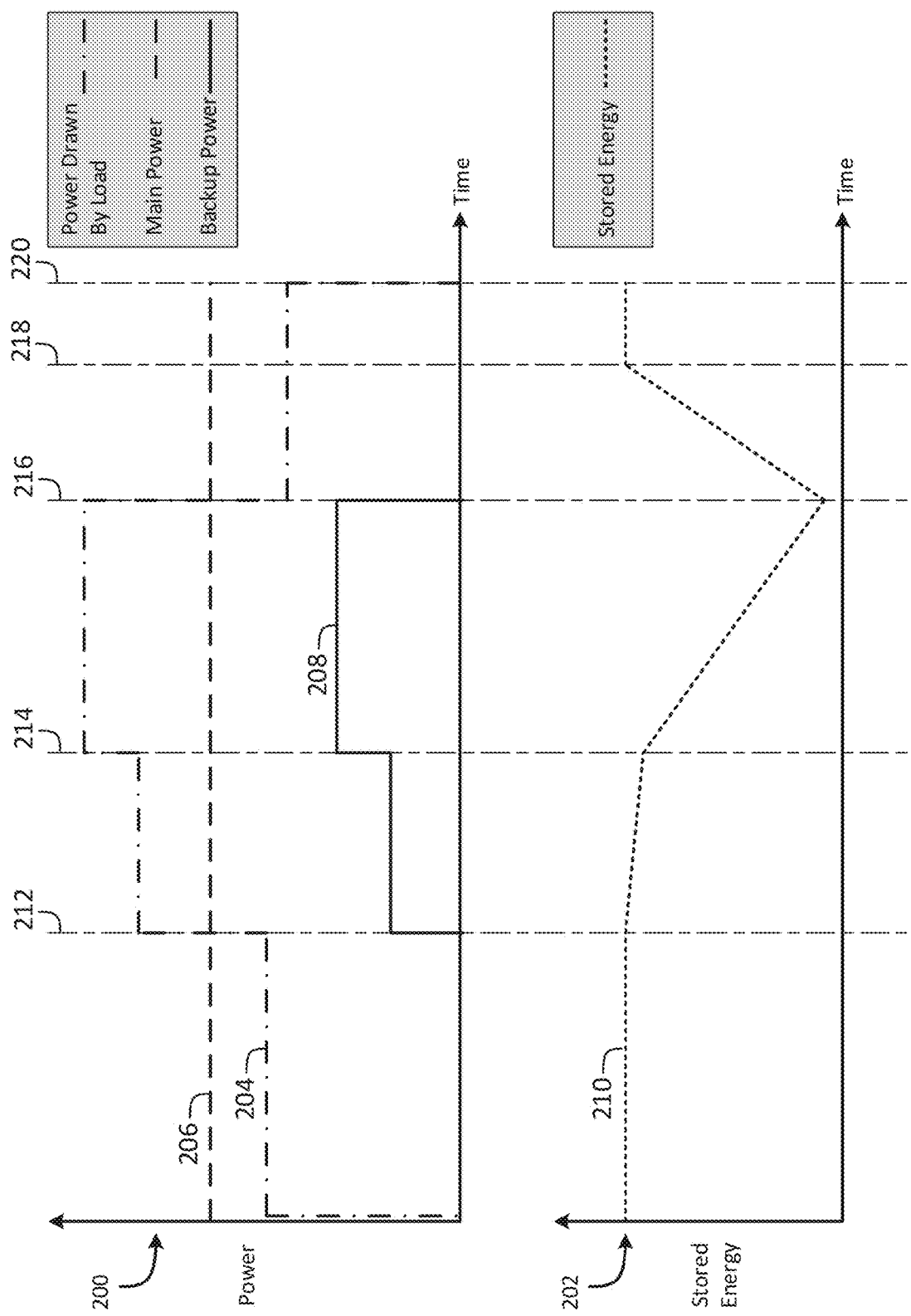
FIG. 2 illustrates graphs indicative of power and energy provided and consumed during execution of a load procedure according to an example.

For example, FIG. 2 illustrates a first graph 200 and a second graph 202 indicative of an example procedure to illustrate the foregoing according to an example. The first graph 200 includes a first trace 204, a second trace 206, and a third trace 208. The first trace 204 indicates a power drawn by a load coupled to the output 116 while executing a procedure. A second trace 206 indicates main power received at the input 102 from a main power source. A third trace 208 indicates backup power received from the energy-storage device 124. The second graph 202 includes a fourth trace 210 indicative of remaining energy stored in the energy-storage device 124 throughout the procedure.

As the procedure begins and until a first time 212, the power drawn by the load, indicated by the first trace 204, is less than the available main power, indicated by the second trace 206. The output power may thus be provided by the main power since the main power can meet the demand of the output power. In some examples, the output power may be provided solely by the main power until the output-power requirements exceed the main power, at which point supplemental power may be drawn from the energy-storage device 124. Accordingly, until the first time 212, no power may be drawn from the energy-storage device 124 as indicated by the third trace 208. Because no power is drawn from the energy-storage device 124, an energy level of the energy-storage device 124 may remain full as indicated by the fourth trace 210.

At the first time 212, the power drawn by the load increases beyond the available main power. Accordingly, the main power may not be able to meet the demand of the output power. Backup power may be drawn from the energy-storage device 124 to supplement the main power as indicated by the third trace 208. The amount of backup power drawn from the energy-storage device 124 may be equal to the output power minus the main power that is available at the input 102. By way of example, if a required output power is 2.0 kW but only 1.8 kW of main power is available, 0.2 kW of backup power may be drawn from the energy-storage device 124. Because power is drawn from the energy-storage device 124, an energy level of the energy-storage device 124 begins to decrease, as indicated by the fourth trace 210.

At a second time 214, the power drawn by the load increases further. Accordingly, more backup power may be drawn from the energy-storage device 124 to supply the extra power drawn by the load. Because more power is being drawn from the energy-storage device 124, the energy level of the energy-storage device 124 begins to decrease at a faster rate.

At a third time 216, the power drawn by the load decreases and is again less than the available main power. Because the main power can meet the load requirements, power may no longer be drawn from the energy-storage device 124. Instead, the UPS 100 may recharge the energy-storage device 124 with at least a portion of the main power that is not being provided to the load. Accordingly, the energy level of the energy-storage device 124 begins to increase. In various examples, the energy-storage device 124 may go through multiple discharge cycles and at least one recharge cycle such that, during a load procedure, the energy-storage device 124 provides an amount of energy to the load that exceeds the maximum energy capacity (that is, an amount of energy that the energy-storage device 124 can store at any one time before being recharged) of the load.

At a fourth time 218, the energy level of the energy-storage device 124 returns to a fully charged level.

At a fifth time 220, the procedure is completed, and the load no longer draws power.

Accordingly, the UPS 100 is capable of providing output power in excess of available main power at least in part by drawing supplemental power from the energy-storage device 124. In various examples, however, it may be advantageous for the UPS 100 to verify that an estimated amount of available energy (for example, from the main power and the backup power) is at least equal to an estimated amount of required energy to perform a procedure before the procedure is allowed to begin. This may advantageously avoid or mitigate a situation in which a procedure ends prematurely because sufficient power is not available.

Figure 3:
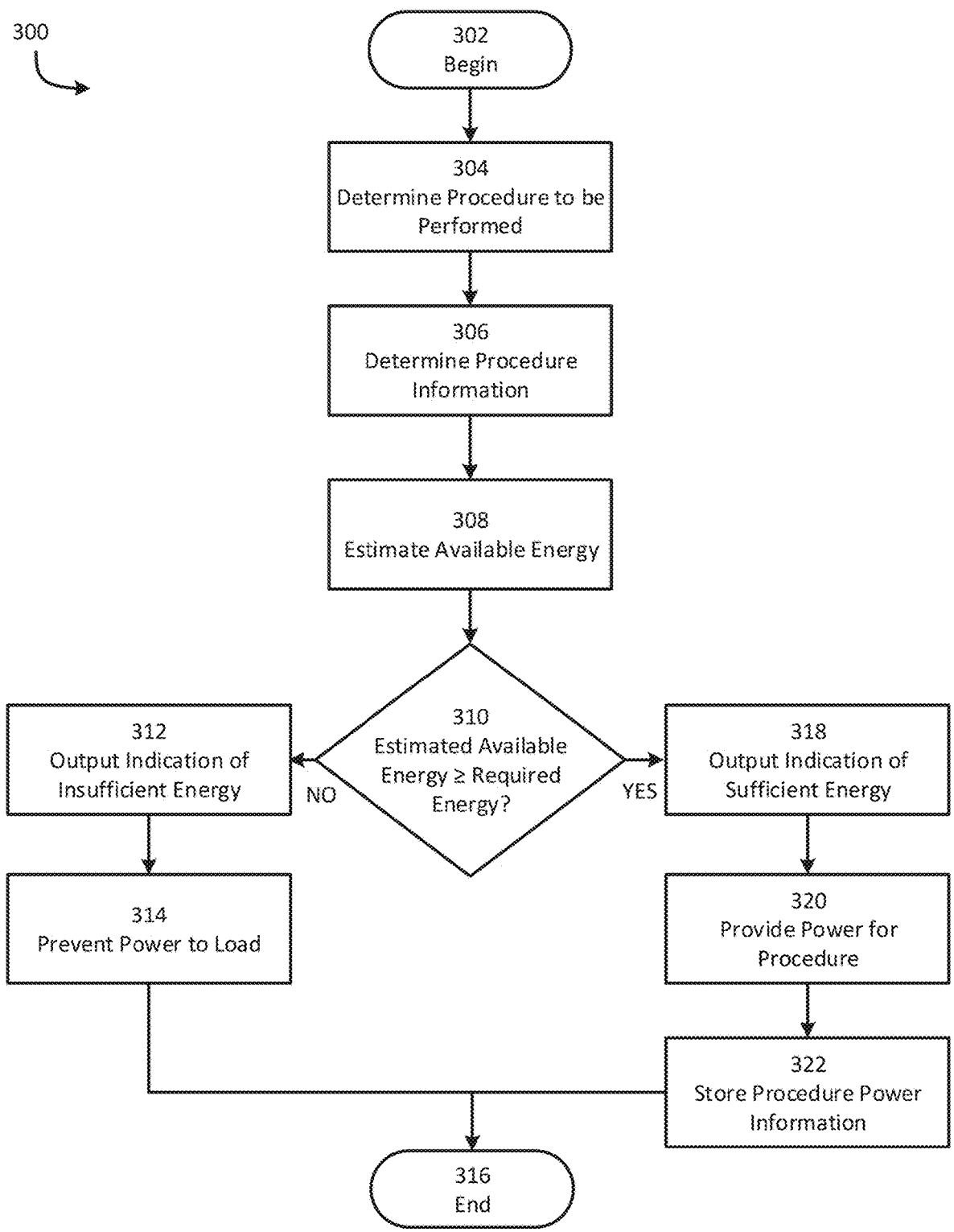
FIG. 3 illustrates a process of determining whether to provide power to a load to perform a load procedure according to an example.

FIG. 3 illustrates a process 300 of controlling the UPS 100 to allow or disallow a load coupled thereto to perform a procedure according to an example. In various examples, the process 300 may be performed by the controller 112. In other examples, the process 300 may be performed by a computing device other than the controller 112. For example, the process 300 may be executed by a server that is external to and remote from (for example, in a different area of a room, in a different room of the same building, in a different building, in a different country, and so forth) the UPS 100.

At act 302, the process 300 begins.

At act 304, the controller 112 determines a procedure to be performed. The procedure may be determined based on one or more inputs indicative of a requested procedure. The one or more inputs may be received via the communication interfaces 120. The one or more inputs may be received from a user, from the load coupled to the output 116, and/or from another entity or source in various examples, such as via a user interface of the communication interfaces 120.

As discussed above, a procedure may be an operation, process, routine, and so forth, performed by a load coupled to the output 116. The procedure may include a certain set of steps or parts and may require a known estimated amount of energy to complete. Determining a procedure to be performed may include determining a type of a procedure (for example, a hemodialysis procedure, a three-dimensional-printing operation, a dishwasher-cycle procedure, and so forth) and, in some examples, additional procedure information.

At act 306, the controller 112 determines procedure information indicative of the procedure identified at act 304. In various examples, the UPS 100 may store procedure information (for example, in the memory and/or storage 118) indicative of various known procedures that the UPS 100 may power. The procedure information may, amongst other features, provide an estimated required energy and/or power for a determined procedure to be executed. In some examples, the controller 112 may also receive additional information, such as information indicative of a patient receiving a medical treatment executed by the load, as discussed in greater detail below. For example, if the procedure is determined at act 304 to be a hemodialysis procedure, the procedure information may include information indicative of a required energy for the load to perform the procedure for the particular user (for example, including a length of a hemodialysis procedure), which may vary between users.

Referring to the graphs 200, 202, the procedure information may be indicative of the power requirements over time of the procedure (and, by extension, a required energy consumed by the procedure within any specified period of time) indicated by the first trace 204. For example, the procedure information may include information indicative of an expected power drawn by the load, and an energy consumption by the load over any arbitrary period of time, throughout the entire procedure. Thus, the UPS 100 may have access to information indicative of an expected power consumption to perform the procedure before the procedure even begins. The procedure information may be pre-programmed into the UPS 100, learned over time as the UPS 100 is operated, received from one or more of the external systems 122, received from a user, a combination of the foregoing, and so forth. The procedure information is discussed in greater detail below with respect to FIGS. 4 and 5.

At act 308, the controller 112 estimates an amount of available energy predicted to be available to the UPS 100 during the procedure. Estimating the amount of available energy may include estimating an amount of available energy from the energy-storage device 124 (for example, by polling the energy-storage device 124 or another device capable of sensing and/or determining an amount of energy stored by the energy-storage device 124) and from the input 102. Estimating the amount of available energy from the energy-storage device 124 may include not only estimating an amount of energy currently stored in the energy-storage device 124 (or which will be stored in the energy-storage device 124 when the energy is needed), but may also include estimating to what extent and when the energy-storage device 124 will be able to be recharged throughout the procedure (for example, at a point during the procedure during which the energy-storage device 124 may be recharged, and between periods of time during which the energy-storage device 124 is discharged). As discussed above, the energy-storage device 124 may be recharged throughout the procedure such that, during a single procedure, the energy-storage device 124 may discharge more energy than the maximum energy capacity of the energy-storage device 124. Referring to the graphs 200, 202, the amount of available energy from the energy-storage device 124 may be indicated by the third trace 208, and the amount of available energy from the input 102 may be indicated by the second trace 206.

Estimating the amount of available energy predicted to be available from the energy-storage device 124 may consider an energy-storage capacity of the energy-storage device 124 and/or whether and to what extent the energy-storage device 124 may be recharged throughout the procedure. For example, although the energy-storage device 124 provides power to the load between the first time 212 and the third time 216, the energy-storage device 124 may not be able to discharge power indefinitely or discharge more energy than the maximum energy-storage capacity of the energy-storage device 124 without first being recharged. Accordingly, act 308 may include estimating an amount of available energy predicted to be available from the energy-storage device 124 at any arbitrary period of time throughout the procedure, which may factor in how much energy the energy-storage device 124 has remaining at any arbitrary time in the procedure and to what extent the energy-storage device 124 is able to be recharged at any arbitrary time in the procedure. As discussed above, the controller 112 may make these determinations and/or estimations based on previously acquired data collected during previous procedures, or may be calculated based on known parameters, such as a known utility-mains power, a known energy-storage-device capacity and ability to be recharged, a known load power consumption throughout execution of the procedure, a combination of the foregoing, and/or other information.

At act 310, the controller 112 determines whether the estimated amount of energy predicted to be available to the UPS 100, determined at act 308, is greater than or equal to the required energy to perform the procedure, determined at act 306. Act 310 may include determining whether, at any time during the procedure, the UPS 100 is predicted to be incapable of providing the power or energy required by the load. For example, consider the period of time between the first time 212 and the third time 216. If the controller 112 were to predict that the energy-storage device 124 is estimated to be depleted of energy between the first time 212 and the third time 216 (that is, before the power draw of the load decreases at the third time 216), the controller 112 may determine, or predict, that the estimated amount of available energy is insufficient to supply the required energy. Accordingly, if the controller 112 determines that the estimated amount of available energy is less than the required energy to perform the procedure (310 NO), the process 300 continues to act 312.

At act 312, the controller 112 outputs an indication that insufficient energy is available to perform the procedure selected or otherwise determined at act 304. For example, the controller 112 may control the communication interfaces 120 to provide one or more indications to a user. The indication(s) may include outputting an audible sound, illuminating one or more light-emitting components, displaying information on a display screen, communicating one or more messages via a wired or wireless medium to a computing device (for example, a smartphone, laptop, desktop, and so forth) accessible to a user, a combination of the foregoing, or other forms of indications.

At act 314, the controller 112 prevents power from being provided to the load to prevent the procedure from initiating. As discussed above, it may be undesirable to allow a procedure to begin if the UPS 100 determines that insufficient energy is estimated to be available to complete a procedure. Accordingly, act 314 may include disallowing power from being provided at the output 116. For example, the controller 112 may open one or more switching devices (or "interlock(s)") in a conductive path to the output 116. In one example, the controller 112 may open one or more switching devices (for example, a relay, FET, BJT, or other switching device) in, or coupled to, the DC/AC inverter 114 such that a conductive path to the output 116 is interrupted. As used herein, opening a switching device may include rendering the switching device non-conductive, and closing a switching device may include rendering the switching device conductive. In some examples, such as examples in which at least a portion of the process 300 is performed by a computing device other than the controller 112 (for example, an external server), the computing device may send, at act 314, instructions to the UPS 100 via the communication interfaces 120 to not power the load, and the UPS 100 (for example, via the controller 112) may execute the foregoing operations to disallow power from being provided at the output 116.

At act 316, the process 300 ends.

Returning to act 310, if the controller 112 determines that the estimated available energy is greater than or equal to the required energy (310 YES), then the process 300 continues to act 318.

At act 318, the controller 112 outputs an indication that sufficient energy is available to power the procedure. For example, the controller 112 may control the communication interfaces 120 to provide one or more indications to a user. The indication may include outputting an audible sound, illuminating one or more light-emitting components, displaying information on a display screen, communicating one or more messages via a wired or wireless medium to a computing device (for example, a smartphone, laptop, desktop, and so forth) accessible to a user, a combination of the foregoing, or other forms of indications.

At act 320, the controller 112 controls the UPS 100 to provide power for the procedure. For example, the controller 112 may control the AC/DC converter 104 to draw main power from the input 102 and/or control the DC/DC converter 108 to draw backup power from the energy-storage device 124 via the energy-storage-device interface 110, and control the DC/AC inverter 114 to provide output power derived from the main power and/or backup power to the output 116. In some examples, the UPS 100 may await instructions from a user (for example, indefinitely or within a certain period of time) affirming a decision to initiate the procedure.

At act 322, the controller 112 stores procedure information. As discussed above with respect to act 306, procedure information may be stored and updated by the controller 112 for analyses. The procedure information may be collected before, during, and/or after the procedure. For example, the UPS 100 may collect data about patient/user profiles, site information, time of treatment, duration of treatment, energy supplied from an energy-storage device during a procedure, energy supplied from a main power source during a procedure, total energy consumed during a procedure, and so forth. The UPS 100, or a computing device coupled thereto (for example, a central database or server configured to aggregate similar information from multiple devices), may analyze the information from previous treatment cycles and the historical trends such that an estimated energy requirement to power a procedure is refined. For example, if the load procedure consumes more or less power than expected, the procedure information may be updated to reflect the higher or lower consumption such that future determinations of energy sufficiency are based on more accurate data.

At act 316, the process 300 ends.

Accordingly, the process 300 provides a determination as to whether power will be provided by the UPS 100 to a load. If a determination is made that power will be provided to the load, the UPS 100 may discharge power to the load to allow the procedure to begin.

Figure 4:
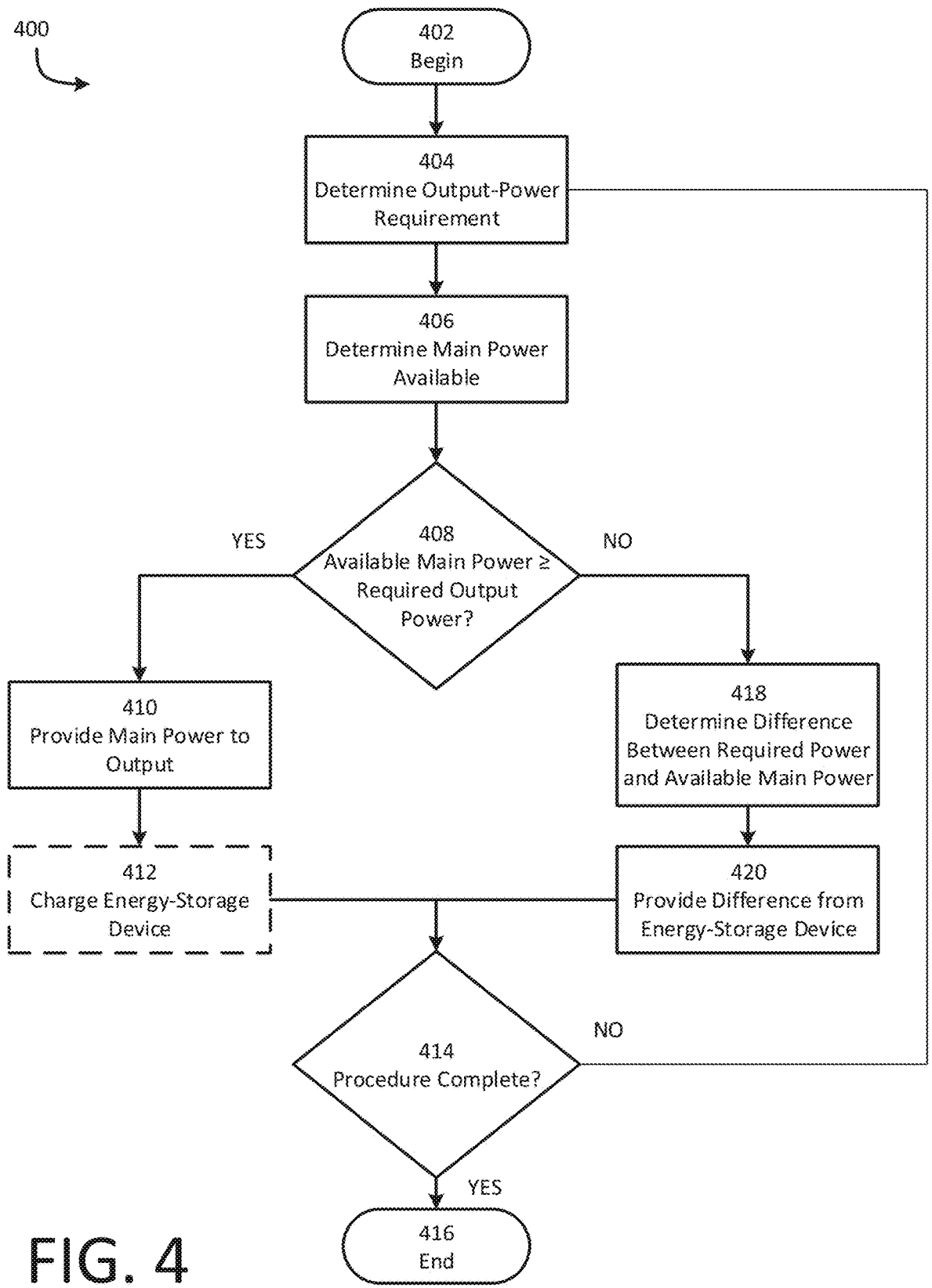
FIG. 4 illustrates a process of controlling the UPS to provide power to a load according to an example.

FIG. 4 illustrates a process 400 of controlling the UPS 100 to provide power to a load during a load procedure according to an example. For example, the process 400 may be executed by the controller 112 responsive to determining that power is to be provided to the load. In some examples, the process 400 provides an example of at least a portion of acts 320 and/or 322.

At act 402, the process 400 begins.

At act 404, the controller 112 determines an output-power requirement. The controller 112 may include or be coupled to one or more sensors (for example, voltage sensors, current sensors, and so forth) to determine an amount of power drawn by and/or demanded by the load. Accordingly, act 404 may include determining, based on one or more sensed parameters (for example, output voltage, output current, and so forth), an amount of power demanded by the load.

At act 406, the controller 112 determines an available main power. For example, the controller 112 may determine an amount of power that is available at the input 102 from a utility mains. In some examples, the controller 112 may have access to information indicative of a rated utility power, which may be standardized in certain regions. Alternatively or in addition, the controller 112 may include or be coupled to one or more sensors (for example, voltage sensors, current sensors, and so forth) configured to determine an amount of power available from the input 102. In various examples, the available main power refers to the power that is capable of being provided at the output 116 and which is derived from the input 102, rather than the power received at the input 102 itself, to account for internal power losses as the UPS 100 processes the power. In other examples, the available main power may refer to power received at the input 102.

At act 408, the controller 112 determines whether the available main power is equal to or greater than the required output power. For example, if 1.8 kW of main power is available, the controller 112 determines whether the required output power is greater than or equal to 1.8 kW. As discussed above, the amount of available main power may refer to the amount of power that is provided at the output 116 and derived from the input 102, which accounts for internal losses. If the available main power is equal to or greater than the required output power (408 YES), then the process 400 continues to act 410.

At act 410, the controller 112 controls the UPS 100 to provide main power to the output 116. For example, the controller 112 may control the AC/DC converter 104 and the DC/AC inverter 114, as discussed above, to provide the output power to the output 116. The main power may satisfy the load demand entirely.

At optional act 412, the controller 112 may control the UPS 100 to charge the energy-storage device 124. For example, optional act 412 may be executed if, for example, the energy-storage device 124 is below a threshold state of charge (SOC) (for example, 99% SOC, 95% SOC, 92.5% SOC, and so forth). Act 412 may include polling the energy-storage device 124 for SOC information, directly calculating SOC information, or otherwise determining an SOC of the energy-storage device 124. If the controller 112 determines that the energy-storage device 124 should be charged, and surplus main power is available (that is, main power not being provided to the output 116), then the controller 112 may control the UPS 100 to charge the energy-storage device 124. As discussed above, charging the energy-storage device 124 may include controlling the AC/DC converter 104 and the DC/DC converter 108 to provide a charging current derived from the input 102 to the energy-storage device 124 via the energy-storage-device interface 110. In other examples (for example, if the energy-storage device 124 is above a threshold SOC), act 412 may not be executed and the energy-storage device 124 is not charged.

At act 414, the controller 112 determines whether the load procedure is complete. For example, the controller 112 may determine whether the load is still drawing power, or may determine whether a signal has been received from the load or a user indicating that the procedure is complete. If the procedure is complete (414 YES), then the process 400 continues to act 416.

At act 416, the process 400 ends.

Otherwise, if the procedure is not complete (414 NO), then the process 400 returns to act 404, and acts 404-408 are repeated.

Returning to act 408, if the controller 112 determines that the available main power is less than the required output power (408 NO), then the process 400 continues to act 418.

At act 418, the controller 112 determines a difference between the required output power and the available main power. For example, if the required output power is 2.0 kW and the available main power is 1.8 kW, the difference may be 0.2 kW.

At act 420, the controller 112 controls the UPS 100 to provide the determined difference to the load from the energy-storage device 124. As discussed above, the controller 112 may control the DC/DC converter 108 to draw the 0.2 kW of power from the energy-storage device 124 and provide the power to the DC/AC inverter 114. The controller 112 may control the DC/AC inverter 114 to convert the 1.8 kW of main power and 0.2 kW of backup power to the output power, and provide the output power to the output 116. The process 400 then continues to act 414, discussed above.

Accordingly, in one example, providing power to a load includes providing output power from a main power source and, if the required output power exceeds the main power, drawing supplemental power from the energy-storage device 124 to supply the deficit. Throughout the execution of the procedure (for example, throughout execution of the process 400), procedure information may be gathered by the controller 112, such as by sensing information (for example, voltage information, current information, ambient- and/or water-temperature information, and so forth), polling devices and/or components (for example, the energy-storage device 124 and/or load) for information, polling a user for information (for example, a patient, doctor, and so forth) and so forth.

As discussed above, the controller 112 may consider procedure information in estimating available energy at act 308. The procedure information may be stored in the memory and/or storage 118 and/or otherwise accessible to the controller 112. Procedure information may include details of a procedure itself, referred to as "treatment information," as well as other relevant information, including "user information," "device information," and, in some examples, additional or different information. It is to be appreciated that the procedure information is divided into these categories for purposes of explanation and clarity only.

Figure 5:
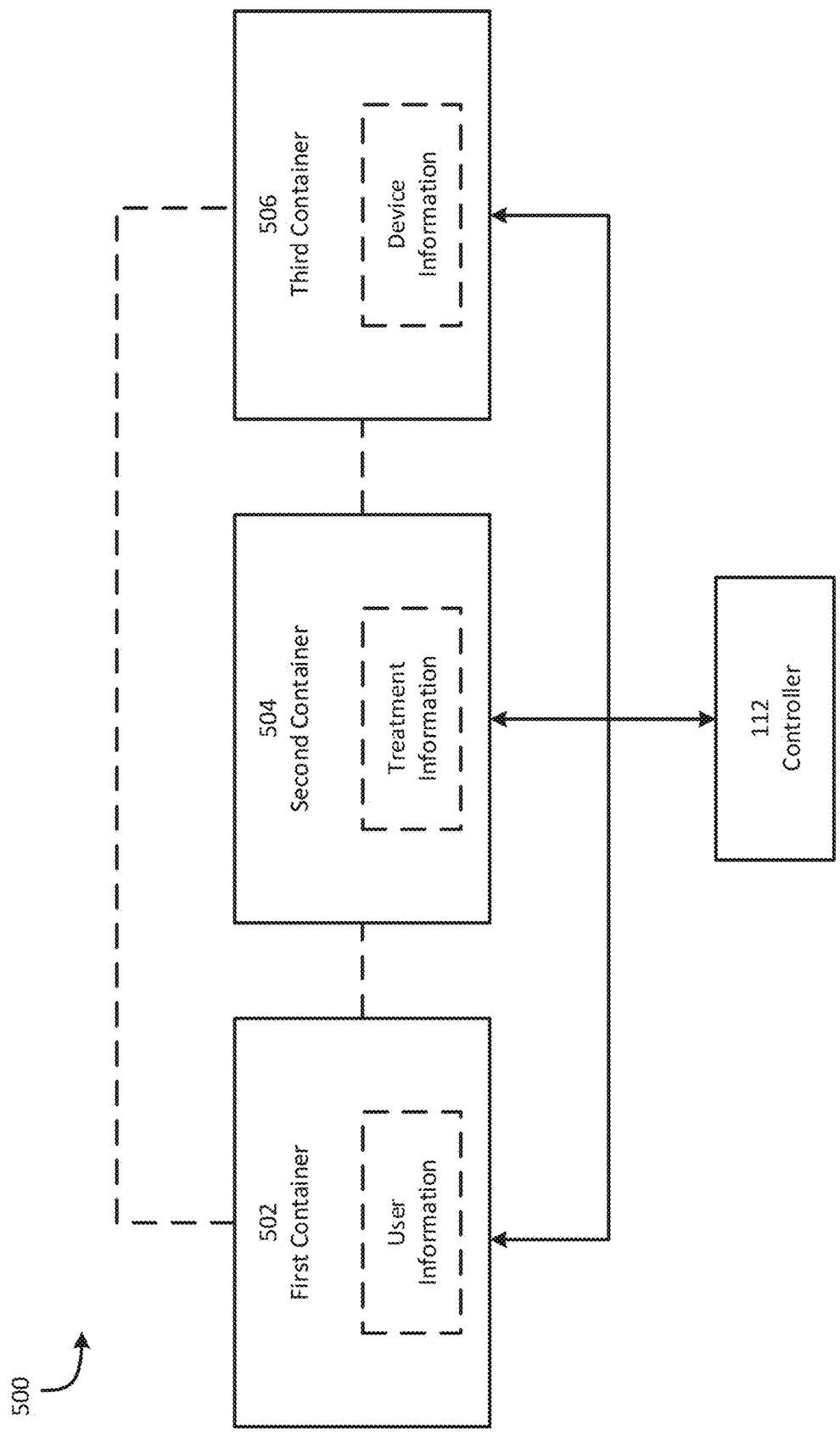
FIG. 5 illustrates a block diagram of a procedure-information storage system according to an example.

FIG. 5 illustrates a block diagram of a procedure-information storage system 500 according to an example. The system 500 may be representative of information stored by the controller 112, memory and/or storage 118, and/or the external systems 122. The system 500 may be distributed across multiple devices, components, and/or systems in some examples.

The system 500 includes a first information container 502, a second information container 504, and a third information container 506. The first information container 502 may store user information. The second information container 504 may include treatment information. The third container 506 may store device information. It is to be appreciated that the containers 502-506 are provided for purposes of explanation. In various implementations, the various types of information are not segmented between different storage resources. In various examples, one of more of the containers 502-506 may be linked to another one or more of the other containers 502-506.

The controller 112 may exchange (for example, store, update, and/or receive) information with the containers 502-506. The containers 502-506 may be representative of memory and/or storage resources within the controller 112, the memory and/or storage 118, the external systems 122, other computing devices, a combination of the foregoing, and so forth. The controller 112 may be configured to analyze and/or update the information stored in the containers 502-506. In some examples, the controller 112 may execute one or more machine-learning algorithms to analyze the information and update the information based on the analysis. For example, the controller 112 may analyze various power-consumption graphs of one or more loads performing a procedure to refine an estimation of an expected power consumption of the one or more loads performing the procedure.

User information stored by the first information container 502 may include information indicative of a user. For example, the user may be a user of the UPS 100, or a user of the load coupled to the UPS. Using a medical device as an example of the load, the user may be a patient or caregiver receiving or administering a medical procedure. User information may include information about the user including, for example, a name of the user, a location of the user, a local electricity cost to the user (which may include, for example, various rates at various times of day, week, month, year, and so forth), utility-power-cost information for the user, incoming-water-temperature information for the user (for example, where a load consumes and heats and/or cools received water), time and/or date information, a medical history of the user, or other relevant information about the user. User information may vary depending on a type of procedure performed by the load. For example, if the load is a three-dimensional printer performing a printing procedure, the user information for the procedure may be different than if the load is a medical device performing a medical procedure.

Treatment information stored by the second information container 504 may include information indicative of a procedure performed by a load capable of receiving power from the UPS 100. It is to be appreciated that treatment information is not limited to medical treatments and may include any procedure executed by a load, such as a dishwasher cycle, a three-dimensional-printing procedure, a dryer cycle, and so forth. Treatment information may include information such as the name of a user, a time of day for a procedure (for example, a time of day for a medical treatment for a patient), a length of time of the procedure (for example, including a length of each individual procedure segment or session and/or a span of time over which several segments or sessions are performed as part of an aggregate procedure, such as a medical treatment), an amount of energy drawn by the load during the procedure over the course of a procedure (for example, as indicated by the first trace 204), an amount of energy and/or power drawn from the energy-storage device 124 over the course of a procedure (for example, as indicated by the third trace 208 and/or the fourth trace 210), and so forth, or other information about a procedure performed by a load. In various examples, the second information container 504 may store any information specific to a procedure executed by a load powered by the UPS 100.

Device information stored by the third information container 506 may include information indicative of the UPS 100, the load coupled to the UPS 100, and/or a device related to the UPS 100 and/or load, such as the energy-storage device 124 and/or external systems 122. For example, device information may include an age of the energy-storage device 124, an energy-storage capacity of the energy-storage device 124 (including, in examples in which the energy-storage device 124 includes multiple energy-storage devices, an energy-storage capacity of each individual energy-storage device), a rated and/or maximum power of the energy-storage device 124, a rated and/or maximum charging power from the UPS 100 to the energy-storage device 124, a number of discharges by the energy-storage device 124 in total and/or over certain time intervals, an age of the UPS 100 and/or components thereof, a state-of-health of the energy-storage device 124, an ambient temperature of the energy-storage device 124 or UPS 100 at a particular time or over periods of time, a type of the load coupled to the UPS 100, an age of the load coupled to the UPS 100, metadata about the UPS 100, the energy-storage device 124, and/or the load coupled to the UPS 100 (for example, model serial number, a make and/or model identifier, an identifier [for example, a MAC address] of the device, and so forth), or any other information about any other component of the UPS 100 or a component connected thereto. As discussed above, in some examples, the energy-storage device 124 may be external to the UPS 100. In various examples, the energy-storage device 124 may include multiple batteries and/or may be replaced by, or supplemented by, one or more energy-storage devices other than batteries, and the device information may indicate a type and number of such energy-storage devices.

Accordingly, the containers 502-506 may store various types of procedure information for analysis. Information stored by the containers 502-506 may be utilized for purposes other than, and/or in addition to, determining whether a load is to be powered. For example, power-consumption information, including information indicative of an amount of utility power and/or utility water consumed, may be stored for reimbursement by an insurance company where a load procedure is, for example, a medical procedure.

It is to be appreciated that in some examples the containers 502-506 may store additional, different, or less information than the examples provided above. Furthermore, the system 500 may include additional or fewer containers than the containers 502-506, and information may be distributed amongst the containers 502-506 in a different manner in various examples. Information stored in one container may overlap with and/or be duplicative of, or be linked to, information stored in another container. For example, such linked and/or duplicative information may include a name of a user, which may be stored in, or linked between, the containers 502, 504.

Procedure information may be gathered from a user, collected during, before, and/or after execution of a procedure (for example, as discussed above at act 322), received from one or more external devices (for example, a central computing device configured to collect and/or analyze information from multiple systems), and so forth. For example, procedure information may be gathered from a user and/or provider before, during, or after a procedure. Using a medical device as an example, a user may be a patient, a doctor, a technician, or another user. A provider may be a provider of the UPS 100. In some examples profile information that is gathered with respect to a user or provider can be associated with specific operating characteristics. As the user operates the system for treatments or processes, the data about those treatments or processes may be stored by the UPS 100 and/other one or more other computing devices. The UPS 100 (for example, via the controller 112) may, as discussed above, use analytics, machine learning, AI, and/or cloud storage to tailor the information provided for the specific user and operating site. Interlocks, alerts, and treatment options may be specific to the user. The alerts and treatment options could be shown on the UPS 100 itself (for example, via the communication interfaces 120) or via a remote monitoring system, for example, implemented as or via the external systems 122.

In some examples, the controller 112 may collect load-power, supplied-power, and stored-energy information, as indicated in FIG. 2, and store the information in the containers 502-506. The controller 112 may store other information including, for example, voltage-variation information indicative of an amount of power available at the input 102, frequency-of-operation information, energy-consumption information, time and/or date information, and so forth.

For example, where the UPS 100 powers a hemodialysis system, frequency-of-operation information may indicate a frequency at which hemodialysis treatments are performed. The frequency-of-operation (or frequency-of-treatment) information may be used to determine a life of the energy-storage device 124 and may be used to determine how often hemodialysis treatments may be performed. Energy-consumption information may be used to determine other information, such as incoming-water-temperature information where the hemodialysis system includes a water-supply device. If the water-supply device heats up incoming water to a particular temperature set point, the water-supply device may consume more energy as a temperature of incoming water decreases, because more energy is required to heat the water. Furthermore, energy-consumption information may be used to identify problems with the load system based on changes (or lack of changes) in energy consumption, and/or may be used to determine cost and/or reimbursement information. Time and/or date information may be used to predict energy consumption. For example, energy consumption may increase during colder months, because incoming-water temperatures may be lower and thus require additional heating.

Accordingly, the UPS 100 may be configured to obtain and analyze information about particular procedures performed by a load coupled to the output 116 in some examples. Furthermore, in some examples, the UPS 100 may be configured to obtain and analyze information about particular individuals with respect to whom the procedures are being performed. Thus, the UPS 100 may be configured to distinguish between a load configured to perform a hemodialysis operation with one patient and the same load configured to perform a hemodialysis operation with a second patient. Differences in energy consumption or requirements, for example, may be identified and considered by the UPS 100 in determining whether an estimated available energy is greater than or equal to a required energy.

Figure 6:
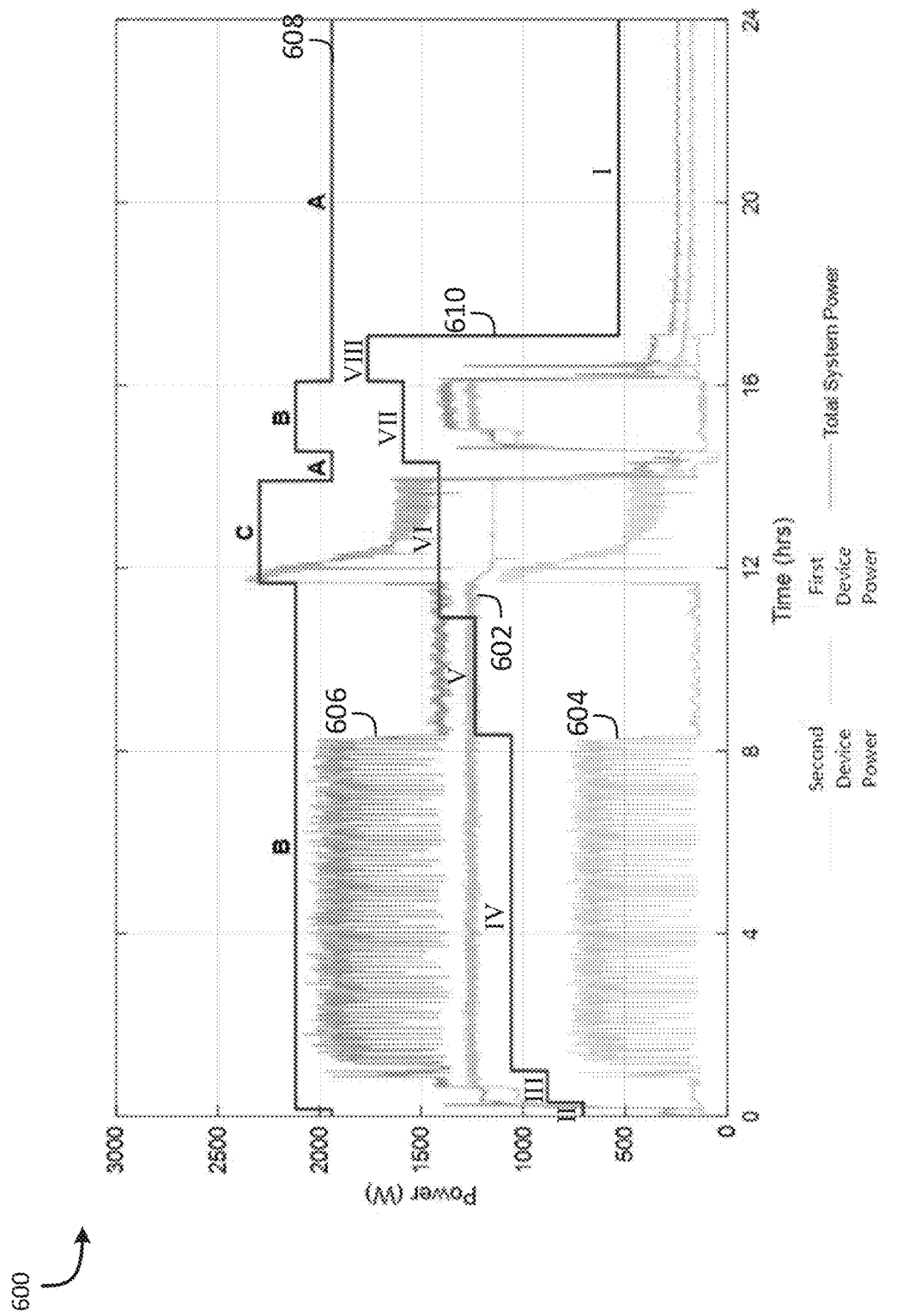
FIG. 6 illustrates a graph of power drawn by a load during a procedure according to an example.

To illustrate the foregoing, FIG. 6 illustrates a graph 600 of power drawn by a load during a procedure according to an example. The load includes a first device and a second device, each of which may operate in different modes or sub-routines throughout execution of the procedure. For example, where the load is a hemodialysis machine, the first device may be a hemodialysis device and the second device may be a water-supply device configured to provide and/or treat water for the hemodialysis device. For example, treating water may include heating, cooling, and/or filtering water. It is to be appreciated that the principles disclosed in connection with the graph 600 are applicable to loads having any number of devices and/or components configured to perform any number of sub-routines.

A first power trace 602 indicates a power consumption by a first device of the load. A second power trace 604 indicates a power consumption by a second device of the load. A third power trace 606 indicates a total system power of the load, which may be a sum of the power consumption of the first device and the second device. In addition, a first mode-of-operation trace 608 indicates a mode of operation of the first device, and a second mode-of-operation trace 610 indicates a mode of operation of the second device. The mode-of-operation traces 608, 610 may indicate a mode of operation in which a respective device operates during given periods of time. Each mode of operation may correspond to a respective sub-routine or sub-procedure of an overall load procedure. For example, and as discussed above, if a device is a water-supply device of a hemodialysis-system load, the water-supply device may include multiple sub-routines including a water-heating sub-routine, a water-filtering sub-routine, and so forth.

For example, at the beginning of the load procedure (that is, at a time of zero along the horizontal axis), the first mode-of-operation trace 608 indicates that the first device operates in a "B" mode of operation. As illustrated by the first power trace 602, a power-consumption behavior of the first device is relatively uniform while in the "B" mode of operation. Similarly, at the beginning of the load procedure, the second mode-of-operation trace 610 indicates that the second device operates in a "II" mode of operation. As illustrated by the second power trace 604, a power-consumption behavior of the second device is relatively uniform while in the "II" mode of operation. While the first device remains in the "B" mode of operation, the second device may cycle through multiple modes of operation, including the "II," "III," "IV," "V," and "VI" modes of operation before the first device transitions to the "C" mode of operation.

A temporal overlap of the mode of operation of the first device with the mode of operation of the second device may correspond to a particular part of the overall procedure executed by the load, each having distinct power-consumption behavior as indicated by the third power trace 606. Each part of the procedure may be denoted by a combination of the mode of operation of the first device and the second device. For example, during times at which the first device is in the "B" mode of operation and the second device is in the "IV" mode of operation, the load may be in a "IV/B" portion of the procedure.

Continuing with this example, the "IV/B" portion may correspond to a patient-treatment part of a hemodialysis operation. Other portions may correspond to, for example, cleaning, sterilization, rinsing, idling, rebooting, and so forth. That is, each portion of the load procedure may be defined by the modes of operation of each device or component making up the load. In other examples, a load may include other devices. In some examples, a load may include a different number of devices. In various examples, a load may include devices other than hemodialysis-related devices and may perform operations other than, or in addition to, hemodialysis-related operations.

As discussed above, in some examples of the process 300, a procedure may be selected and the UPS 100 may determine whether the procedure may be powered by the UPS 100. In other examples, the UPS 100 may first determine which procedures, if any, the UPS 100 is presently capable of powering, and may await a selection of an available procedure. For example, the UPS 100 may determine an amount of available energy and determine which procedures can be powered based on the amount of available energy. In one example, a user may then select an available procedure for execution.

In various examples, for procedures which are not available, the UPS 100 may provide information indicative of what actions, if any, may be taken to power the procedures. For example, the UPS 100 may indicate that adding additional energy-storage capabilities to the energy-storage device 124 (for example, by adding additional energy-storage devices or replacing an installed energy-storage device with a higher capacity energy-storage device or devices) would enable certain procedures to be performed. In another example, where the energy-storage device 124 is in the process of being recharged, the UPS 100 may determine and indicate which procedures, if any, will be available and when as the energy-storage device 124 is recharged. For example, the UPS 100 may provided an estimated wait time until sufficient energy is predicted to be available.

In some examples, however, the UPS 100 may not be able to power the operation even if the energy-storage device 124 is fully charged. In one example, the energy-storage device 124 may be nearing an end-of-life, and a maximum capacity of the energy-storage device 124 may be so diminished as to be unable to support a given procedure. In another example, a temperature of incoming water may be very low, thus requiring a significant amount of energy to warm the water to a desired temperature. The required amount of energy may be greater than the maximum capacity of the energy-storage device 124. In some examples, the controller 112 may provide information to a user indicating whether the UPS 100 will be able to power an operation within a certain period of time (for example, after the energy-storage device 124 recharges or after an ambient temperature, and thus an incoming water temperature, increases). If the controller 112 is able to power an operation within a given (for example, configurable) period of time in the future, the controller 112 may provide an indication to a user that the procedure may be initiated at that time. The controller 112 may then repeatedly execute the acts discussed above until a determination is made that the UPS 100 can power a procedure desired by a user, at which point power may be provided subject, in some examples, to approval by a user.

As discussed above, in some examples the UPS 100 will not provide power to a load if it is predicted that insufficient energy is available to power the entire load procedure. In other examples, the controller 112 may enable the UPS 100 to perform a portion of a procedure even if energy stored in the energy-storage device 124 is insufficient to perform the entire procedure. A procedure may include multiple parts, and the controller 112 may allow the UPS 100 to power the load for fewer than all of the multiple parts.

Continuing with an example provided above with respect to FIG. 6, a hemodialysis procedure may include multiple parts, including a treatment portion and a post-treatment-sterilization portion. It may be necessary to perform the post-treatment-sterilization portion before the hemodialysis procedure is executed again, but it may not be necessary to perform the post-treatment-sterilization portion of the procedure immediately after the treatment portion. Moreover, there may be no or minimal risk to a patient even if the post-treatment-sterilization portion is interrupted for lack of power, which may not be true of the treatment portion. The UPS 100 may allow the hemodialysis to proceed if sufficient energy is present to power the treatment portion, even if sufficient energy is unavailable to power the post-treatment-sterilization portion. After the treatment portion is complete, power to the hemodialysis device may be temporarily discontinued while the UPS 100 recharges the energy-storage device 124 and, once the energy-storage device 124 is sufficiently recharged, the UPS 100 may again provide power to the hemodialysis device for the hemodialysis device to complete the procedure. Accordingly, in some examples of the process 300, the UPS 100 may determine if the UPS 100 is capable of performing at least a portion of a procedure rather than determining if the UPS 100 is capable of performing an entire procedure. This determination may vary by procedure.

As discussed above, in some examples the controller 112 may activate an interlock to prevent power from being provided at the output 116 based on the determination that insufficient energy is predicted to be available to power a procedure or portion thereof. Activating the interlock may include controlling the DC/AC inverter 114 to not provide any power to the output 116. This may prevent a user from proceeding with an operation for which the controller 112 has determined sufficient power is unavailable, thus avoiding a situation in which the operation is forced to stop mid-procedure because sufficient power is unavailable. In some examples, the controller 112 may provide a mechanism to nonetheless allow the operation to proceed, such as by enabling a user to override the interlock. For example, the controller 112 may enable a user to provide one or more inputs via the communication interfaces 120 to provide an override input. In some examples, only certain users, such as treatment providers, may be able to override the interlock, such as by providing credentials (for example, a password, biometric input, and so forth) to the UPS 100. In other examples, a wider range of users, such as patients, may be able to override the interlock. As indicated above, however, in some examples no user is able to override the interlock in any scenario.

Accordingly, examples have been provided in which a UPS powers a load performing a procedure. Various modifications to the examples provided above are within the scope of the disclosure. For example, although certain examples have been provided with respect to medical-device loads, the principles of the disclosure are applicable to loads other than medical-device loads. In some examples, a UPS may not power a load if energy stored in an energy-storage device coupled to, or included in, the UPS is less than the difference between the energy requirements of an operation of the load and output power derived from a main-power input (for example, a utility mains input). In various examples, the UPS may not power a load even if energy stored in the energy-storage device exceeds the difference between the energy requirements and the mains-input power.

For example, the UPS may require that the stored energy exceed the energy difference by a minimum threshold amount in order for the stored energy to be considered "sufficient." This may avoid or mitigate a situation in which the energy requirements of the load are unexpectedly high and threaten to consume more power than the energy-storage device can sustain. The threshold amount may be an absolute value (for example, 10 J) or a relative value (for example, 10% more than an estimated required energy). In various examples, this minimum threshold may be refined over time. For example, the threshold may be reduced as the UPS collects more information and thereby becomes more confident in its estimate of the energy requirements of the load. In some examples, the minimum threshold may be configurable by a user. In other examples, the UPS may not implement such a minimum threshold.

In some examples, the UPS may not provide power to a load even if stored energy is sufficient to power an operation while supplementing main power. For example, the UPS may determine that the UPS may lose access to main power during the operation and thereby jeopardize the ability of the UPS to power the entire operation in the event that the stored energy is insufficient to complete the operation. That is, the determination at act 308 as to an estimated available energy may consider a likelihood of the main power being dropped for any period of time.

The determination may be based, for example, on information collected by the UPS 100 indicative of the input power received at the input 102. In another example, the UPS 100 may receive information from the external systems 122 indicating that main power may be lost. For example, such information may indicate rolling blackouts in a location near the UPS 100. In various examples, the UPS may determine, prior to powering an operation, a confidence that the UPS 100 may lose access to power at the input 102 during the operation. If the confidence is above a threshold, the UPS 100 may not power the operation. The threshold may be configurable by a user in some examples. In various examples, the UPS 100 may refine the threshold over time as the UPS 100 collects information and is more capable of predicting a loss of input power at a higher confidence. In some examples, the UPS 100 may not power an operation if stored energy in the energy-storage device 124 is insufficient to power an operation by itself, without any main power.

As discussed above, the process 300 may be executed by the controller 112 in some examples. Furthermore, as discussed above, the controller 112 may perform various analysis operations (for example, AI-based operations) to refine certain operations performed by the controller 112, such as estimating an available energy that is predicted to be available to the UPS 100 throughout a procedure. In various examples, one or more of the foregoing processes may be performed by one or more different devices in addition to, or in lieu of, the controller 112. For example, the controller 112 may provide procedure information to an external computing device which may be configured to perform at least some of the above-discussed processes. The computing device may, in some examples, be coupled to multiple UPSs and/or other devices such that a wider range of information sources is available with which to perform analyses.

As discussed above with respect to acts 308 and 310, the controller 112 may determine whether sufficient energy exists to power a procedure. In some examples, the controller 112 may also determine whether sufficient power exists to power a procedure. For example, the controller 112 may determine whether, at any time throughout the procedure, the output-power requirements exceed the output-power capabilities of the UPS 100. This may be applicable where, for example, ample energy is available to the UPS 100, but the maximum power rating of the UPS 100 is insufficient to meet the output-power requirements. Accordingly, acts 308 and 310 may include determining a required power of the load throughout execution of the procedure, estimating an amount of power that will be available from the input 102 and the energy-storage device 124 throughout the procedure, and determining whether the amount of estimated available power is equal to or greater than the required power throughout the procedure. If the required power ever exceeds the available power for a threshold period of time (which may include no, or zero, time), the UPS 100 may prevent power from being provided to the load.

As discussed above, the UPS 100 may be configured to receive main power from the input 102. In some examples, the input 102 may be coupled to a utility mains input, and the main power may be utility-mains power. In other examples, the input 102 may be coupled to another main-power source, such as a generator, microgrid, turbine, and so forth, configured to provide power. Furthermore, the UPS 100 may include multiple inputs each configured to receive power from multiple sources other than, and/or in addition to, the main power source coupled to the input 102 and/or the energy-storage device 124. In some examples, the UPS 100 may be configured to receive AC power at the one or more inputs. In other examples, the UPS 100 may be configured to receive DC power at at least one of the one or more inputs. Furthermore, although the UPS 100 may be configured to provide DC power at the output 116 in various examples, in other examples the UPS 100 may be configured to provide AC power at the output 116, or at another output in addition to, or in lieu of, the output 116.

Various controllers, such as the controller 112, may execute various operations discussed above. Using data stored in associated memory and/or storage, the controller 112 also executes one or more instructions stored on one or more non-transitory computer-readable media, which the controller 112 may include and/or be coupled to, that may result in manipulated data. In some examples, the controller 112 may include one or more processors or other types of controllers. In one example, the controller 112 is or includes at least one processor. In another example, the controller 112 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power device comprising:
a first input configured to be coupled to a main power source;
a second input configured to be coupled to a back-up power source;
an output configured to be coupled to a load, the load being configured to perform a procedure; and
at least one controller configured to
determine a total required energy for the load to execute and complete the procedure;
estimate an amount of available energy predicted to be available to the power device throughout execution of the procedure, the available energy being derived from at least the back-up power source;
determine whether the amount of available energy predicted to be available is equal to or greater than the total required energy; and
prevent power from being provided at the output responsive to determining that the amount of available energy predicted to be available is less than the total required energy.

2. The power device of claim 1, wherein the at least one controller is further configured to control the power device to deliver power to the output responsive to determining that the amount of available energy is equal to or greater than the total required energy.

3. The power device of claim 1, further comprising an output switch coupled to the output, and wherein preventing power from being provided at the output includes controlling the output switch to be in a non-conducting state.

4. The power device of claim 1, wherein determining whether the amount of available energy predicted to be available is equal to or greater than the total required energy includes:
determining a required power of the load throughout an execution of the procedure by the load;
estimating an amount of power that will be available from the main power source and the back-up power source throughout the execution of the procedure; and
determining whether the amount of power estimated to be available from the main power source and the back-up power source is equal to or greater than the required power throughout the execution of the procedure.

5. The power device of claim 4, wherein the at least one controller is configured to prevent the power from being provided at the output responsive to determining that the required power of the load is predicted to be greater than the estimated amount of power that will be available from the main power source and the back-up power source at any time during the procedure.

6. The power device of claim 1, wherein the at least one controller is configured to:
control, while the load executes the procedure, the power device to draw main power from the main power source; and
control, while the load executes the procedure, the power device to draw back-up power from the back-up power source responsive to determining that a required power of the load is greater than the main power.

7. The power device of claim 1, wherein the at least one controller is further configured to control the power device to deliver power to the output responsive to determining that the amount of available energy predicted to be available is equal to or greater than the total required energy, and wherein an amount of energy received from the back-up power source and provided to the load during the procedure is greater than a maximum energy capacity of the back-up power source.

8. A computing device for analyzing a power device having a first input configured to be coupled to a main power source, a second input configured to be coupled to a back-up power source, and an output configured to be coupled to a load configured to perform a procedure, the computing device comprising:
at least one processor configured to
determine a total required energy for the load to execute and complete the procedure;
estimate an amount of available energy predicted to be available to the power device throughout execution of the procedure, the available energy being derived from at least the back-up power source;
determine whether the amount of available energy predicted to be available is equal to or greater than the total required energy; and
prevent power from being provided at the output responsive to determining that the amount of available energy predicted to be available is less than the total required energy.

9. The computing device of claim 8, wherein the computing device is the power device.

10. The computing device of claim 8, wherein the computing device is remote from the power device.

11. The computing device of claim 10, wherein the computing device is a server external to the power device.

12. The computing device of claim 8, further comprising at least one communication interface configured to be communicatively coupled to the power device, and wherein preventing the power from being provided at the output includes providing, via the communication interface, instructions to the power device to not provide power to the load.

13. A non-transitory computer-readable medium storing thereon sequences of computer-executable instructions for analyzing a power device having a first input configured to be coupled to a main power source, a second input configured to be coupled to a back-up power source, and an output configured to be coupled to a load configured to perform a procedure, the sequences of computer-executable instructions including instructions that instruct at least one processor to:

determine a total required energy for the load to execute and complete the procedure;

estimate an amount of available energy predicted to be available to the power device throughout execution of the procedure, the available energy being derived from at least the back-up power source;

determine whether the amount of available energy predicted to be available is equal to or greater than the total required energy; and prevent power from being provided at the output responsive to determining that the amount of available energy predicted to be available is less than the total required energy.

14. The non-transitory computer-readable medium of claim 13, wherein the instructions further instruct the at least one processor to control the power device to deliver power to the output responsive to determining that the amount of available energy predicted to be available is equal to or greater than the total required energy.

15. The non-transitory computer-readable medium of claim 13, wherein the power device further includes an output switch coupled to the output, and wherein preventing power from being provided at the output includes controlling the output switch to be in a non- conducting state.

16. The non-transitory computer-readable medium of claim 13, wherein determining whether the amount of available energy predicted to be available is equal to or greater than the total required energy includes:

determining a required power of the load throughout an execution of the procedure by the load;

estimating an amount of power that will be available from the main power source and the back-up power source throughout the execution of the procedure; and determining whether the amount of power estimated to be available from the main power source and the back-up power source is equal to or greater than the required power throughout the execution of the procedure.

17. The non-transitory computer-readable medium of claim 16, wherein the instructions instruct at least one processor to prevent the power from being provided at the output responsive to determining that the required power of the load is predicted to be greater than the estimated amount of power that will be available from the main power source and the back-up power source at any time during the procedure.

18. The non-transitory computer-readable medium of claim 13, wherein the instructions further instruct the at least one processor to:

control, while the load executes the procedure, the power device to draw main power from the main power source; and control, while the load executes the procedure, the power device to draw back-up power from the back-up power source responsive to determining that a required power of the load is greater than the main power.

19. The non-transitory computer-readable medium of claim 13, wherein the instructions further instruct the at least one processor to control the power device to deliver power to the output responsive to determining that the amount of available energy predicted to be available is equal to or greater than the total required energy, and wherein an amount of energy received from the back-up power source and provided to the load during the procedure is greater than a maximum energy capacity of the back-up power source.

20. A method of analyzing a power device having a first input configured to be coupled to a main power source, a second input configured to be coupled to a back-up power source, and an output configured to be coupled to a load configured to perform a procedure, the method comprising:

determining a total required energy for the load to execute and complete the procedure;

estimating an amount of available energy predicted to be available to the power device throughout execution of the procedure, the available energy being derived from at least the back-up power source;

determining whether the amount of available energy predicted to be available is equal to or greater than the total required energy; and preventing power from being provided at the output responsive to determining that the amount of available energy predicted to be available is less than the total required energy.

* * * * *